United States Patent
Ebert et al.

(10) Patent No.: US 9,615,589 B2
(45) Date of Patent: Apr. 11, 2017

(54) DECOUPLED DRIVE UNITS FOR GATHERING AND OVER-SPREADING

(71) Applicant: Poly-clip System GmbH & Co. KG, Hattersheim (DE)

(72) Inventors: Detlef Ebert, Bad Nauhiem (DE); Gerd Freiberger, Michelstadt-Vielbrunn (DE); Wolfgang Nikoley, Mainz-Kastel (DE)

(73) Assignee: Poly-clip System GmbH & Co. KG, Hattersheim (DE)

(*) Notice: Subject to any disclaimer, the term of this patent is extended or adjusted under 35 U.S.C. 154(b) by 31 days.

(21) Appl. No.: 14/869,630

(22) Filed: Sep. 29, 2015

(65) Prior Publication Data

US 2016/0095326 A1  Apr. 7, 2016

(30) Foreign Application Priority Data

Oct. 1, 2014 (EP) .................................. 14187385
Nov. 7, 2014 (EP) .................................. 14192340
Sep. 23, 2015 (EP) .................................. 15186432

(51) Int. Cl.
*A22C 11/00* (2006.01)
*A22C 11/12* (2006.01)
*A22C 11/02* (2006.01)

(52) U.S. Cl.
CPC ........ *A22C 11/125* (2013.01); *A22C 11/0245* (2013.01)

(58) Field of Classification Search
CPC ......... A22C 11/00; A22C 11/02; A22C 11/10; A22C 11/0227; A22C 13/0003; A22C 15/001

(Continued)

(56) References Cited

U.S. PATENT DOCUMENTS 6,659,853 B1 * 12/2003 Hergott .............. A22C 11/0272
452/31
6,855,046 B2 * 2/2005 Cate ....................... A22C 11/00
452/30

(Continued)

FOREIGN PATENT DOCUMENTS

DE  19644074 A1  5/1998
EP  0000821 A1  2/1979

(Continued)

OTHER PUBLICATIONS

Extended European search report issued in the related European Application No. 15187436.9-1655 dated Feb. 2, 2016 (6 pages).

(Continued)

*Primary Examiner* — Richard Price, Jr.
(74) *Attorney, Agent, or Firm* — Fitch, Even, Tabin & Flannery LLP

(57) ABSTRACT

The present invention relates to a clipping machine and a method for producing sausage-shaped products, like sausages, by filing a flowable filling material into a tubular or bag-shaped packaging casing and closing said packaging casing by a closure means, like a closure clip. The clipping machine comprises a filling tube for feeding the filling material into the tubular or bag-shaped packaging casing stored on the filling tube and being closed at its first end, gathering means for gathering the filled tubular or bag-shaped packaging casing and for forming a plait-like portion thereto, the gathering means includes a first displacer unit and a second displacer unit, and a clipping device having a first and a second closing tool being reversibly movable between an opened position and a closed position, for applying at least one closure means to the plait-like portion and closing said closure means when the closing tools are in their closed position. The clipping machine includes common drive means for commonly reversibly radially moving (Continued)

the gathering means from an opened position into a closed position for performing the gathering movement, and the clipping tools for applying said closure means on the plait-like portion and closing said closure means. The clipping machine further comprises single drive means for separately reversibly driving the second displacer unit for executing a movement in axial direction for forming the plait-like portion, at least partially independently from the common drive means. The clipping machine further comprises a control unit for controlling the single drive means at least partially independently from the common drive means and at least a first sensor associated with the common drive means and at least a second sensor associated with the single drive means, which are coupled to the control unit.

12 Claims, 4 Drawing Sheets

(58) Field of Classification Search
USPC .................. 452/30–32, 35–37, 46–48, 51
IPC .................. A22C 11/02,11/00, 11/10, 11/0245, 11/0254
See application file for complete search history.

(56) References Cited

U.S. PATENT DOCUMENTS

| | | | |
|---|---|---|---|
| 7,479,057 B2* | 1/2009 | Waldstaedt | A22C 11/105 452/32 |
| 8,323,079 B2* | 12/2012 | Hanten | A22C 11/125 452/31 |
| 8,870,634 B2* | 10/2014 | Niedecker | A22C 11/0209 452/37 |
| 8,882,570 B2* | 11/2014 | Hanten | A22C 11/0245 452/37 |

FOREIGN PATENT DOCUMENTS

| | | |
|---|---|---|
| EP | 2532245 A1 | 12/2012 |
| EP | 2647291 A1 | 10/2013 |
| WO | 2011/134094 A1 | 11/2011 |

OTHER PUBLICATIONS

Extended European search report issued in the related European Application No. 14187385.1-1655 dated Mar. 20, 2015 (6 pages).

* cited by examiner

DECOUPLED DRIVE UNITS FOR GATHERING AND OVER-SPREADING

CROSS-REFERENCE TO RELATED APPLICATIONS

The present application claims the benefit of priority of European Patent Application No. 15186432.9 filed Sep. 23, 2015, European Patent Application No. 14192340.9-1655 filed Nov. 7, 2014, and European Patent Application No. 14187385.1-1655 filed Oct. 1, 2014, the contents of which are incorporated herein by reference in their entirety.

FIELD

The present invention relates to a clipping machine for producing sausage-shaped products and to a method for producing sausage-shaped products.

BACKGROUND OF THE INVENTION

In practice, it is known that, for example in the production of sausage-shaped products, like sausages, filling material is fed by a filling machine through a filling tube of a clipping machine into a tubular or bag-shaped packaging casing which is temporarily stored on the filling tube and which is closed at its front end, i.e. the end pointing in the feeding direction of the filling material, by, for example, a closure means, like a closure clip, or by a fusing line at this end, respectively. The tubular packaging casing is pulled-off from the filling tube while being filled filling material fed into the casing by the feeding pressure. At least during the filling process, a casing brake applies a frictional force to the tubular packaging casing while being pulled-off from the filling tube, in order to control the pull-off speed and to ensure an at least approximately constant filling degree.

After a predetermined volume of filling material has been filled into said tubular packaging casing, gathering means with a first and a second displacer unit which can each be formed by a pair of reversibly movable displacement elements, form a plait-like portion of the tubular packaging casing, which is at least substantially free of filling material. By moving the first and second displacer units relative to each other, the length of the plait-like portion may be varied. For example, products being completely filled with filling material, or tightly filled, are usually provided with a relatively short plait-like portion whereas products being only partly filled with filling material are provided with a relatively long plait-like portion to produce a slack filled sausage-shaped product. The clipping machine then places and closes at least one closure clip at the plait-like portion forming the rear end of the sausage or bag-shaped product, i.e. the end pointing opposite to the feeding direction by respective closing tools which are reversibly movable towards the plait-like portion.

From DE laid open document 196 44 074, a clipping machine is known, which comprises first and second closing tools as well as first and second displacer units each including a pair of displacer elements which are linearly movable between their opened and closed position for gathering a filled tubular casing. The closing tools are driven by respective piston/cylinder drives. The displacer elements of the displacer units are also linearly movable by a respective separate drive means. Additionally, the displacer units include an additional drive for linearly moving the displacer units relative to each other for forming the plait-like portion on which the closure means are to be placed by the closing tools.

DE laid open document 1 786 585 discloses a clipping machine which includes gathering means for gathering a filled packaging casing, and closing means for closing the filled packaging casing. The gathering means include a first and a second displacer unit each having a pair of displacer elements, wherein the second displacer unit is axially movable away from and towards to the first displacer unit, for forming a plait-like portion on which at least one closure clip may be placed for closing the filled packaging casing. The movement of the gathering means for gathering the filled packaging casing, the movement of the closing means for placing and closing the at least one closure clip, and the movement of the second displacer unit away from and towards to the first displacer unit, are derived from a common drive.

In the case that the movement of all moved major devices of a clipping machine, like the closing tools, the gathering means, particular the first and second displacer units, or the like, are driven by a common drive, and are coupled to each other in a fixed relationship, e.g. via mechanical coupling means, like gear transmissions, a minimum of control amount is necessary for controlling the clipping machine. On the other hand, such a machine provides only a minimum flexibility in changing the production process. In case that each movable major devices of a clipping machine has its own drive, a huge construction and control amount is necessary for controlling such a clipping machine which provides a maximum flexibility in adapting the production process, e.g. to different products to be produced.

BRIEF SUMMARY OF THE INVENTION

Thus, it is an object of the present invention to provide a clipping machine and a method for producing sausage-shaped products, like sausages, which overcome the above mentioned drawbacks and which allow a simplified and compact construction and a maximum flexibility in adapting the production process to a large number of different products to be produced.

According to the present invention, there is provided a clipping machine for producing sausage-shaped products, like sausages, by filing a flowable filling material into a tubular or bag-shaped packaging casing and closing said packaging casing by a closure means, like a closure clip. The clipping machine comprises a filling tube for feeding the filling material into the tubular or bag-shaped packaging casing stored on the filling tube and being closed at its first end, gathering means for gathering the filled tubular or bag-shaped packaging casing and for forming a plait-like portion thereto. The gathering means includes a first displacer unit and a second displacer unit, and a clipping device having a first and a second closing tool being reversibly movable between an opened position and a closed position, for applying at least one closure means to the plait-like portion and closing said closure means when the closing tools are in their closed position.

The clipping machine includes a common drive means for commonly reversibly radially moving the gathering means from an opened position into a closed position for performing the gathering movement, and for moving the clipping tools for applying said closure means on the plait-like portion and closing said closure means. The clipping machine further comprises a single drive means for separately reversibly driving the second displacer unit for executing a movement in axial direction for forming the plait-like portion, at least partially independently or separately from the common drive means.

The clipping machine further comprises a control unit for controlling the single drive means at least partially independently from the common drive means, and at least a first sensor associated with the common drive means and at least a second sensor associated with the single drive means, which are coupled to the control unit.

Based on the signals of the first and second sensors, and controlled by the control unit, the clipping machine according to the present invention allows to separately execute the forming of a plait-like portion on the filled tubular casing, at least approximately independently from the combined gathering and clipping movement. Thereby, the length of the plait-like potion may be varied dependent on the kind of product to be produced. Moreover, dependent on the time necessary for forming the plait-like portion, the common drive means for commonly reversibly radially moving the gathering means from an opened position into a closed position for performing the gathering movement, and for moving the clipping tools for applying said closure means on the plait-like portion and closing said closure means, may be adapted, e.g. accelerated, decelerated or stopped, at least temporarily, in order to optimize the production cycle.

For enabling controlling the clipping machine on the basis of the signals of the first and second sensor, these sensors may be of any suitable kind, like rotary encoder, absolute position transducer, acceleration sensors or the like. Accordingly, the sensors may thereby detect different kinds of information, like an absolute position, a height, speed or acceleration, which may be used for controlling the common drive means and the single drive means. The sensors themselves may detect or may be used to determine absolute values, like absolute positions, angles or the like, on the basis of which the control unit may control the clipping machine, i.e. the movement of the drive means.

In an advantage configuration, the first and second sensors are adapted for detecting the moving paths of the common drive means and the single drive means, respectively.

In a preferred embodiment of the inventive clipping machine, the common drive means include an electric drive motor and mechanical coupling means for positively coupling the radial movement of the gathering means and the radial movement of the clipping tools. The movement of electric drive motors, like multiphase motors or step motors, may very exactly be controlled, thereby a very precise clipping cycle may be reached.

The mechanical coupling of the movement of the gathering means and the clipping tools may be realized in various ways, e.g. by belt or chain drives, levers or the like. According to the present invention, it is further preferred, that the mechanical coupling means include a cam plate having a first cam for reversibly radially moving the gathering means, and a second cam for reversibly radially moving the second closing tool, and a belt drive coupled to the cam plate, for reversibly radially moving the first closing tool. Cam plates provide a reliable and accurate coupling of the gathering means and the clipping tools.

The movement of the closing tools may be executed as a pivot movement or a linear movement. In order to ensure the correct and save closing of the closure means, advantageously, the first closing tool, which may be a punch, is at leas approximately linearly moved between the opened position and the closed position, in an at least approximately radial direction. This specific design requires a minimum available space. Since the closing tools, in this configuration, abut the closure means, e.g. the closure clip, symmetrically, the quality of the closure is enhanced.

An at least substantially linear movement of the first closing tool can be achieved by using a crank mechanism, which enables a defined linear movement of the first closing tool. Naturally, the first closing tool may be driven by other means which enable a linear movement of the first closing tool, like respective levers and corresponding linear guide means or other eccentric drive means.

Also, the movement of the second closing tool may be realized in various ways. The second closing tool may be pivoted or may be moved linearly into the closed and opened position. In a preferred configuration, the second closing tool is attached to a tool arm for being reversibly pivoted between the opened position and the closed position. The pivotally arranged tool arm may not only carry the second closing tool, which may be a die, but it may also provide a guide for guiding the closure mans, like closure clips arranged in a line of clips.

Advantageously, the single drive means can also include an electric drive motor, like a multiphase motor or step motor which may very exactly be controlled. Additionally, when using equal drive motors for the common drive means and the single drive means, the control amount may further be reduced.

In the inventive clipping machine, for linearly moving the second displacer unit while forming the plait-like portion to the tubular casing, the single drive means can further include a drive belt or a drive chain and a linear guidance to which the second displacer unit is coupled. This configuration enables the performance of a linear movement of a defined length and in a defined direction. Naturally, other transmissions for enabling a linear movement of the second displacer unit are possible, like eccentric transmissions or lever arrangements.

In a preferred embodiment of the inventive clipping machine, a control unit is provided for controlling the common drive means and the single drive means. The control unit is adapted to start and stop the common drive means in accordance with the single drive means, at least in order to prevent collision between the clipping tools and the gathering means.

In order to enable the control unit to control the inventive clipping machine, in particular the common drive means and the single drive means, a first sensor is provided for capturing the movement of the common drive means, and a second sensor is provided for detecting the movement of the single drive means. Via said sensors which are coupled to the control unit, the clipping machine may be controlled, in particular, the common drive means and the single drive means may be adjusted to each other, e.g. for enabling the production of different kinds of sausage-shaped products, and for preventing collision between the machine elements.

The first sensor for detecting the movement of the common drive means may be positioned at the central shaft which is directly driven by a motor, like an electric motor. Alternatively, the first sensor may be provided at any other suitable element of the common drive means, from the movement of which a signal for controlling the movement of the common drive means, and thus, from the gathering means while performing the gathering movement or the clipping tools during the clipping movement, may be derived. According to one alternative embodiment, the first sensor may be provided on the rotor of the electric motor of the common drive means.

The second sensor for detecting the movement of the single drive means may also be provided at any suitable element from the movement of which a signal for controlling the movement of the single drive means may be derived. Said second sensor may be positioned directly on the rotor of the electric motor of the single drive means, on one of the deflection rollers of the belt drive, on the belt itself or on a slide which is guided along the linear guide elements.

The clipping machine according to the present invention may also comprise a discharge device, preferably in the form of conveyor means, including a conveyor, like a belt conveyor, for discharging the sausage-shaped product just produced, out of the clipping machine. For adapting the conveyor, particularly the height of the upper run of the conveyor, to the size, particularly the diameter, of the sausage-shaped product to be produced, the height of the upper run of the conveyor may be adjusted to the lower side of the sausage-shaped product to be produced.

Means for adjusting the height of the discharge device are provided, which may have any suitable design. Said means for adjusting the height of the discharge device, and in particular, the height of the conveyor, may include vertically arranged guide means and securing means, for manually adjusting the height of the conveyor. Alternatively, the height adjustment means may include a separate drive for automatically adjusting the height of the conveyor. It has to be understood that the adjustment means may be controlled by the control unit of the clipping machine. Also, controlling the adjustment means may be integrated into the control of the whole production process, that means the adjustment means may be controlled in accordance with the common drive means and the single drive means. Alternatively, the adjustment means may be controlled independently or separately from the common drive means and the single drive means.

Independently from or additionally to the adjustment means, for preventing a miss alignment of the conveyor and for preventing collision between moving parts of the inventive clipping machine, like the displacer units, and the discharge device, a third sensor is provided, which may detect the position, like the height of the upper run of the conveyor, or corresponding dimensions, relative to the clipping machine. On the basis of the signal of the third sensor which is also coupled to the control unit, the clipping machine may be controlled, i.e. for preventing collisions, and for ensuring that the conveyor is in a position corresponding to the size of the sausage-shaped product to be produced. The third sensor associated with the discharge device, and coupled to the control unit, and, not necessarily, but may be of the same kind as the first and second sensors.

For controlling the inventive clipping machine, the first, second and third sensors may detect or may be used to determine absolute values, like absolute positions, angles or the like, on the basis of which the control unit may control the clipping machine, i.e. the movement of the drive means. That means that the movement of the respective drive means may be started or stopped when the sensor of the respective other drive means detects a predefined value.

Alternatively or additionally, the inventive clipping machine may be controlled dynamically. That means that the respective drive means are controlled on the basis of the values currently detected by the respective sensors, i.e. the drive of one of the single drive means, the common drive means or the discharge device, may be started or stopped prior one or both of the respective other drives have reached a predefined end position or the respective sensor has detected a target value. Particularly, the movement of said drive, like its speed or acceleration, may be controlled on the basis of the signal currently outputted by the respective sensors of the respective other drives.

In one embodiment of the inventive clipping machine, the movement of the discharge device is controlled and automatically executed on the basis of the signals of the first, second and third sensors. That means, based on the current positions of the gathering means, sensed by the first and second sensors, the height of the discharge device, detected by the third sensor, may be adjusted such that a collision between the gathering means, in particular the second displacer unit, may securely be prevented.

The positions of the common drive means, the single drive means and the discharge device vary during the production process. In particular, after forming the plait-like portion to the filled tubular casing by the second displacer unit, the second displacer unit is moved towards the first displacer unit and the displacer elements of the displacer units are moved radially outwardly for releasing the plait-like portion.

For preventing a collision between the discharge device and the second displacer unit during the radial outward movement of the displacer elements of the second displacer unit, the discharge device may be moved downwardly into a lower position immediately after the production process of the current sausage-shaped product has been finished. The movement of the displacer elements of the second displacer unit may follow this downward movement of the discharge device with a predefined time gap, and thereafter, the second displacer unit is moved towards the first displacer unit.

Alternatively, in a further preferred embodiment of the inventive clipping machine, the movement of the discharge device and the gathering means may be controlled such that the downward movement of the discharge device is executed in accordance with the radial movement of the displacer elements of the first and second displacer units and the axial movement of the second displacer unit towards the first displacer unit. That means, at the same time, the discharge device moves downwardly, the displacer elements of the gathering means are moved radially outwardly and the second displacer unit is moved axially towards the first displacer unit.

On the other hand, in the case that the adjustment means of the discharge unit are manually operated, the signal of the third sensor which detects the height of the discharge unit, may be used for controlling the clipping machine such that the production process may be started only if the discharge unit is positioned on the correct height, e.g. dependent on the product to be produced, or, in case that the discharge unit is not correctly positioned, that the start of the production process is prevented.

On the basis of the signal of the first and second sensor, and as an additional feature, also the signal of the third sensor, the positions of the drives of the common drive means and the single drive means are known at any time point, during the production process and before or after the production has been started or stopped. Naturally, also the position of the conveyor is known at any of these time points.

The sensor information may not only be used for controlling the movement of the devices coupled to the common drive means, the single drive means and/or the conveyor means. Additionally to the control of the production process, or as a feature independently therefrom, the signals may also be used for synchronizing the movement of all movable parts, i.e. when starting the clipping machine, common drive means and single drive means based on the signals of the first and second sensors may run a predefined way to be moved into a starting position. This predefined movement is selected such that, while moving into the starting position, independent from their current position, a collision between the movable elements of these devices coupled to the common drive means and the single drive means, is prevented. This feature may be used e.g. for securely preventing collisions after a maintenance or after cleaning the inventive clipping machine.

In order to optimize the production cycle, the control unit is adapted to vary the drive speed of the common drive means. In adaption to the operation of the single drive means while forming the plait-like portion, the drive speed of the common drive means may be reduced or advanced, or the common drive means may, at least temporarily, be stopped, for example, by the control unit. In the case that a very long plait-like portion has to be created, the clipping cycle, namely the closing movement of the clipping tools, may temporarily be stopped after the gathering means have finished the radial gathering movement and before the linear movement of the second displacer unit has started. If the distance between the first and second displacer units is sufficient, the closing movement of the clipping tools may be continued by restarting the common drive means. Additionally, in case that the linear movement of the second displacer unit is not finished the common drive means, and thus, the closing movement of the closing tools, may again be stopped, or the drive speed may be reduced such that the closing action is executed immediately after the forming of the plait-like portion is finished. Further exemplarily, in case that a short plait-like portion has to be created, the closing movement of the closing tools not necessarily needs to be stopped. It may be sufficient to reduce the drive speed of the common drive means, accordingly.

Additionally or alternatively, in order to further adapt the production cycle to different kinds of products to be produced on the inventive clipping machine, the control unit is adapted to vary the start or end point of a clipping cycle.

Furthermore, according to the present invention, there is provided a method for producing sausage-shaped products, like sausages, on a clipping machine, the clipping machine comprises a filling tube for feeding the filling material into the tubular or bag-shaped packaging casing stored on the filling tube and being closed at its first end, gathering means for gathering the filled tubular or bag-shaped packaging casing and for forming a plait-like portion thereto, the gathering means includes a first displacer unit and a second displacer unit, and a clipping device having a first and a second closing tool being reversibly movable between an opened position and a closed position, for applying at least one closure means to the plait-like portion and closing said closure means when the closing tools are in their closed position, a common drive means for commonly reversibly driving the gathering means for performing the gathering movement, and the clipping tools for applying said closure means on the plait-like portion and closing said closure means, and a single drive means for reversibly driving the second displacer unit for executing a movement in axial direction for forming the plait-like portion. The clipping machine further includes a control unit for controlling the common drive means and the single drive means, and at least a first sensor and a second sensor which are coupled to the control unit, the first sensor being associated with the common drive means and the second sensor being associated with the single drive means, The method comprises the steps of filling a predetermined portion of filling material into the tubular or bag-shaped packaging casing stored on the filling tube, gathering the filled packaging casing by radially moving the gathering means from an opened position into a closed position and applying and closing at least one closure means to a plait-like portion formed by the gathering means, by commonly driving the gathering means and the clipping tools by a common drive means, and moving the second displacer unit in axial direction for forming said plait-like portion on which the at least one closure clip has to be applied, by single drive means at least approximately independently from said common drive means, and the step of controlling the movement of the single drive means by the control unit, at least partially independently from the common drive means.

The method according to the present invention may further comprise one or a combination of the steps of controlling the drive speed of the common drive means in accordance with the drive speed of the single drive means, varying at least the drive speed of the common drive means and varying the start or end point of a clipping cycle.

The inventive method thereby realizes all advantages explained in conjunction with the inventive clipping machine, particularly, the inventive method enables a maximum flexibility with regard to the kinds of products which may be produced n the inventive clipping machine with a minimal control amount.

It has to be understood that the common drive means may be controlled on the basis of specific programs depending on the kind of products to be produced, considering the kind of tubular casing and/or the kind of filling material. The common drive means may run at constant speed, at a predetermined velocity profile, or in intervals of equal or different speed separated by stopping the common drive means.

Independent from the drive speed or the velocity profile of the common drive means, the single drive means may run on a different speed or the velocity profile, in order to realize the required length of the plait-like portion. The only requirement with regard to the coupling of the common drive means and the single drive means is the start of the linear movement of the single drive means, which necessarily has to be executed before the clipping tools enter the space between the first and second displacer unit.

The first and second sensors in conjunction with the electric motors enable a very exact control of the movement of the common drive means and the single drive means before, during and after the production process. During varying the drive speed of the common drive means and the single drive means, at least one of the drive means may be stopped. Thereby, the production process is executed in defined steps separated by stopping one of the drive means. Alternatively, the common drive means and the single drive means may continuously be driven, with at least one of the drive means driven at a very low speed. This prevents stopping the movement of elements of the common or single drive means, and a respective restart of this movement and to overcome inert forces of said elements.

Further advantages and preferred embodiments of the present invention will be described in the following together with the drawings listed below. The expressions "left", "right", "below" and "above" used in the following description, are referred to the drawings in an alignment such that the reference numbers and the notation of the FIGS. used can be read in normal orientation.

DETAILED DESCRIPTION OF THE DRAWINGS

Figure 1:
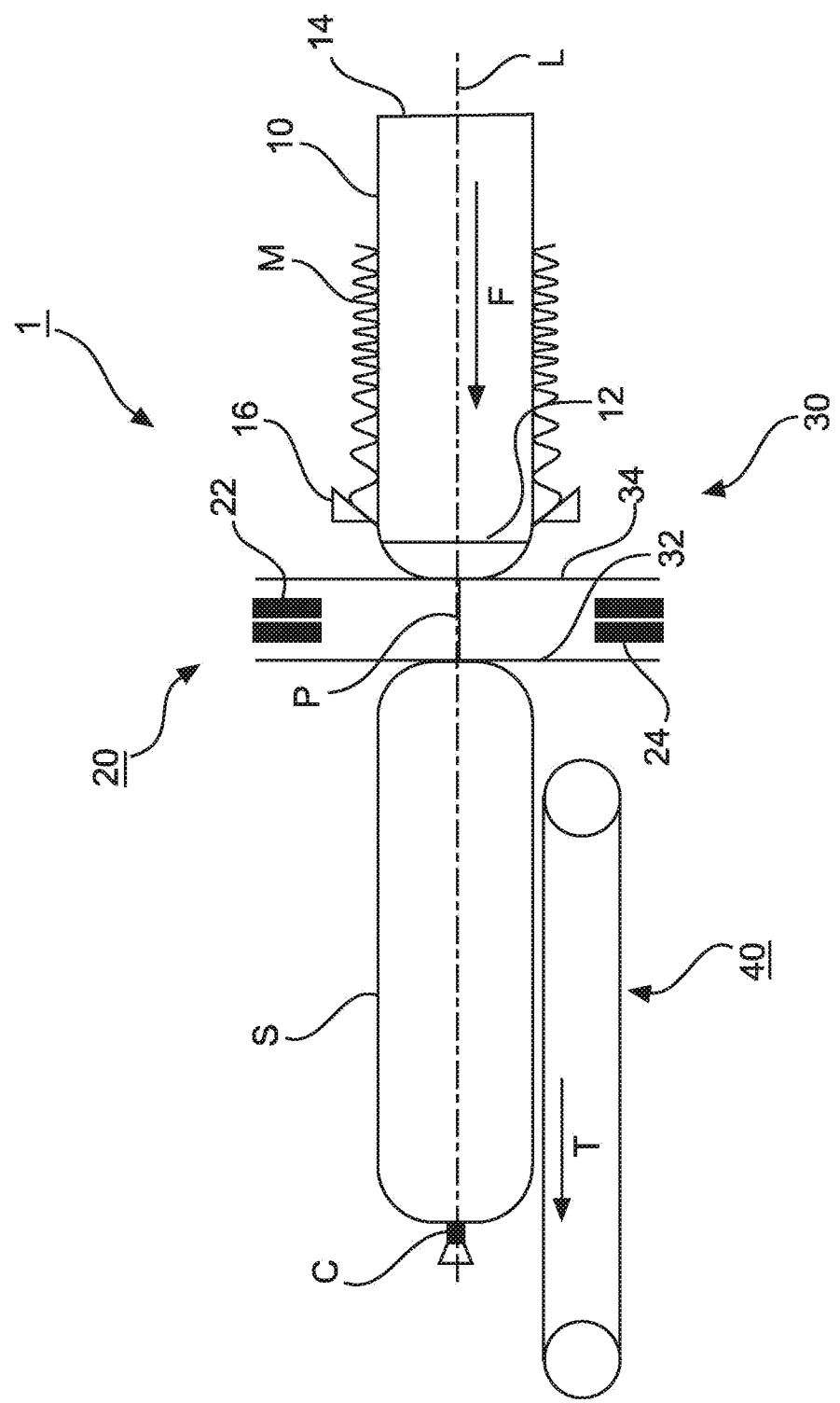
FIG. 1: is a schematic view showing principle design of a clipping machine.

A clipping machine 1 for producing sausage-shaped products S shown in FIG. 1, comprises as main components a filling tube 10 having a longitudinally extending center axis L and with a discharge opening for a filling material at its left end 12 and a feeding opening for the filling material fed to the filling tube 10, for example a feeding pump, at its right end 14, a casing brake assembly 16 arranged coaxially with filling tube 10 in the region of the left end 12 of filling tube 10. Filling tube 10 is made of a suitable material, like stainless steel. A supply of tubular packaging casing material M made of a thin sheet material is stored on the filling tube 10. From the supply of tubular packaging casing material M, a single packaging casing is pulled-off during the process of manufacturing the sausage-shaped products S. Clipping machine 1 further comprises a clipping device 20 for closing a filled tubular packaging casing M by applying closure means, like closure clips C, to a plait-like portion P, and gathering means 30 for gathering the filled tubular packaging casing M and for forming said plait-like portion P thereto, and which are all arranged downstream filling tube 10.

Right end 14 of horizontally arranged filling tube 10 is coupled to a filler arrangement (not shown in FIG. 1) including a pump for feeding filling material through filling tube 10 in a feeding direction F into tabular packaging casing M closed on its front end facing in the feeding direction F, by a closure clip C.

As it can be inferred from FIG. 1, positioned immediately downstream left end 12 of filling tube 10, clipping device 20 is arranged and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the just filled tubular packaging casing M for forming a sausage-shaped product S, and a second closure clip C for closing the front end of the tubular packaging casing M subsequently to be filled. Gathering means 30 includes a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P.

Furthermore, for discharging a sausage-shaped product S just produced from clipping machine 1, downstream clipping device 20, a transportation device like a belt conveyor 40 may be arranged, which may comprise a conveyor belt and guide rollers. Transportation direction T of belt conveyor 40 coincides with feeding direction F. The height of the upper conveyor belt section of belt conveyor 40 is aligned to the lower side of the sausage shaped product S just produced and discharged from clipping machine 1. For aligning the height of the upper conveyor belt section of belt conveyor 40 to the lower side of the sausage shaped product S, an alignment device for varying the height of conveyor 40 may be provided, as it will be explained in greater detail in conjunction with FIG. 2.

Figure 2:
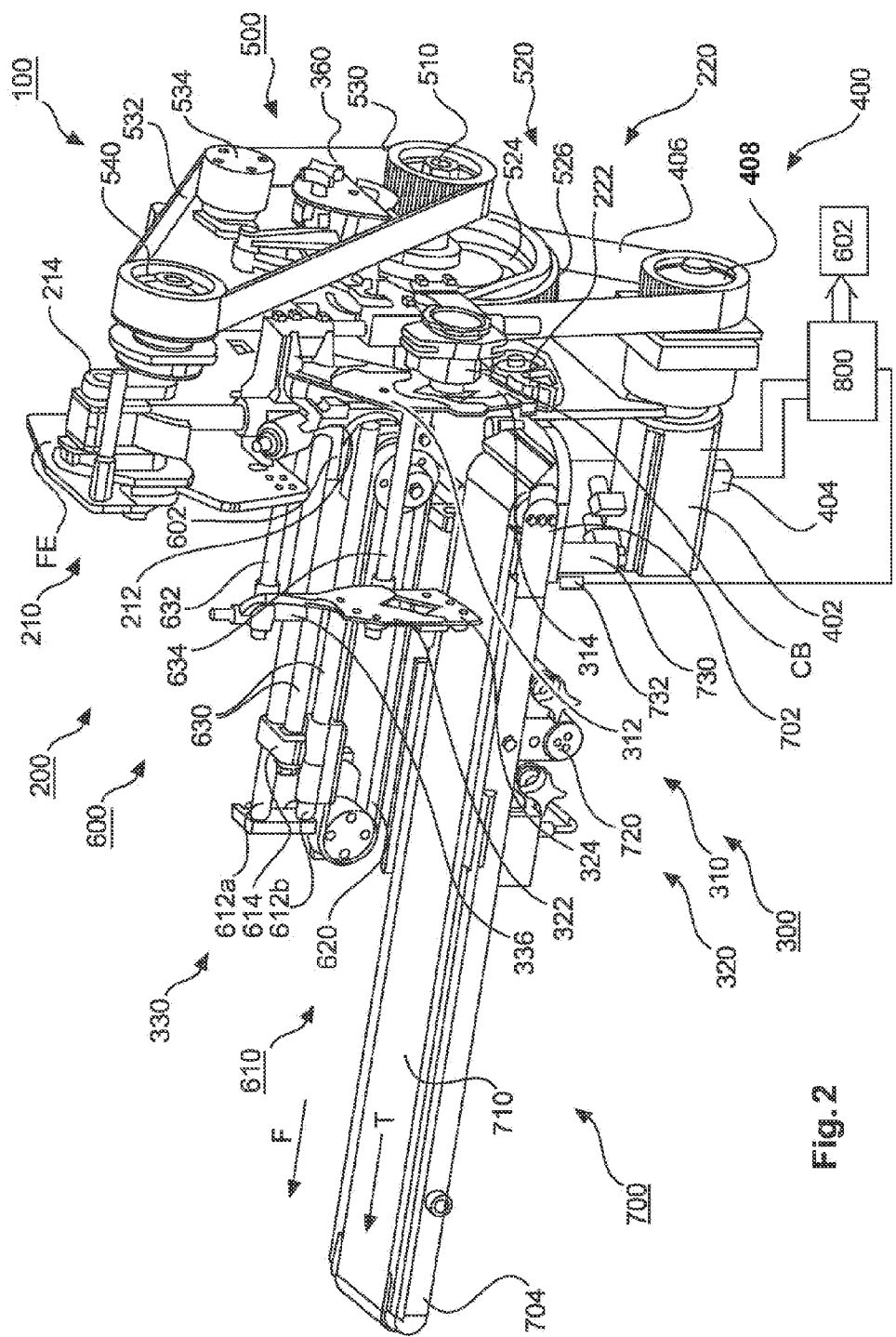
FIG. 2: is a schematic and perspective view to a specific embodiment of a clipping machine according to the present invention.

FIG. 2 is a schematic and perspective view to a specific embodiment of a clipping machine 100 according to the present invention.

According to FIG. 2, clipping machine 100 comprises a clipping device 200 including a first closing tool assembly 210 having a first closing tool or punch 212, and a second closing tool assembly 220 having a second closing tool or die 222, gathering means 300 including a first displacer unit 310 having an upper displacer element 312 and a lower displacer element 314, and a second displacer unit 320 having an upper displacer element 322 and a lower displacer element 324, common drive means 400 including a first drive element or electric motor 402 and mechanical coupling means 500 for coupling clipping device 200 and gathering means 300. Clipping machine 100 further comprises single drive means 600 including a second drive means or electric motor 602 and being coupled to second displacer unit 320, for reversibly, axially moving the second displacer unit 320 in feeding direction F. A casing brake CB is provided upstream first displacer unit 310, and is coaxially arranged with the filling tube (not shown) and the openings formed by upper and lower displacer elements 312, 322; 314, 324 of first and second displacer units 310, 320 when in their opened position.

Mechanical coupling means 500 include an approximately horizontally arranged central shaft 510, a cam plate 520 having a first cam (not visible in FIG. 2) and a second cam 524 arranged on opposite side surfaces of cam plate 520. Cam plate 520 further comprises gear teeth 526 arranged at the circumferential surface of cam plate 520. Cam plate 520 is mounted on central shaft 510.

Electric motor 402 is arranged parallel to and approximately vertically below central shaft 510 of coupling means 500, and comprises a toothed wheel 404 attached to the free end of its rotor. Toothed wheel 408 is vertically aligned with cam plate 520, and a tooth belt 406 is wound about toothed wheel 408 of motor 402 and can plate 520, for driving central shaft 510.

Second clipping tool arrangement 220 includes second closing tool or die 222 attached to a pivotally mounted tool arm 224. The pivotal movement of tool arm 224 for reversibly moving die 222 between the opened and the closed position, is derived from first cam of cam plate 520. In FIG. 2, the closing tools, punch 212 and die 222, are in the opened position, with the maximum distance there between.

On central shaft 510, a further toothed wheel 530 is mounted, for driving first closing tool arrangement 210. First closing tool arrangement 210 includes punch 212 which is driven between its opened position and its closed position by a crank mechanism which will be disclosed in greater detail in conjunction with FIG. 3.

Figure 3:
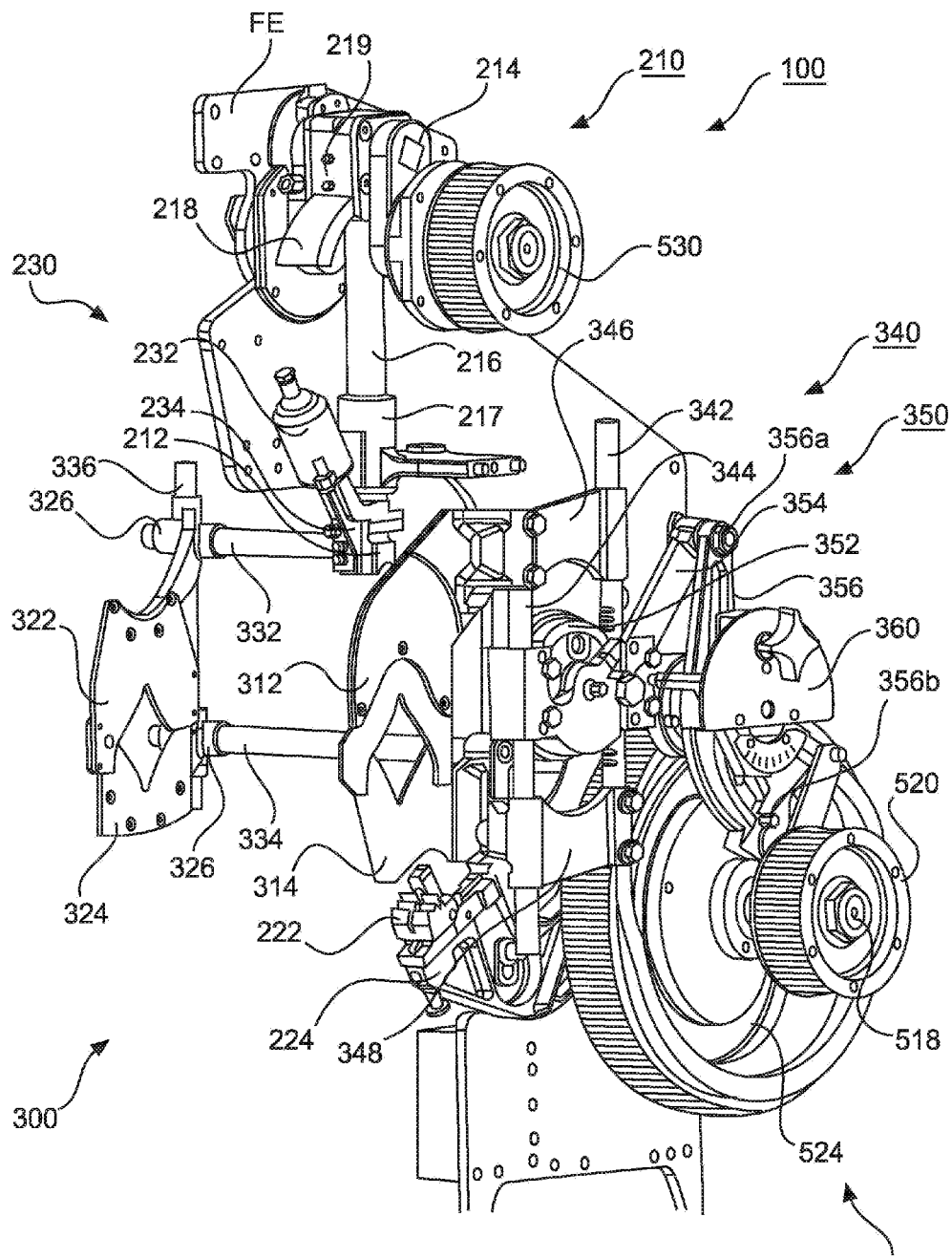
FIG. 3: is a detailed view to the clipping machine according to FIG. 2.

As it can be inferred from FIG. 3, a toothed wheel 540 is mounted on crank shaft 214 of the crank mechanism and vertically aligned to toothed wheel 530 on central shaft 510. A toothed belt 532 is wound about toothed wheels 530 and 540 for driving first closing tool arrangement 210. A tensioning roller 534 is arranged relative to the inner surface of toothed belt 532 such that it may provide tension to belt 532 and for preventing belt 532 from being engaged by other parts of the clipping machine of FIG. 2.

Gathering means 300, particularly upper and lower displacer elements 312, 322; 312, 324 of first and second displacer units 310, 320, are coupled to guide means 330 for guiding upper and lower displacer elements 312, 322; 312, 324 while gathering the filled tubular casing M, and while forming plate-like portion P. Guide means 330 include horizontally arranged guide rails 332, 334, along which second displacer unit 320 is reversibly movable in axial direction away from first displacer unit 310. A vertically arranged guide rail 336 is provided, to which the upper and lower displacer elements 322, 324 of second displacer unit 320 are coupled and along which upper and lower displacer elements 322, 324 are guided during the gathering movement, together with the horizontally arranged guide rails 332, 334. Vertical guide rail 336 is reversibly movable in axial direction away from first displacer unit 310 together with upper and lower displacer elements 322, 324 of second displacer unit 320, for forming plait-like portion P.

The right ends of horizontal guide rails 332, 334, according to FIG. 2, are coupled to a gathering mechanism 340 for reversibly moving horizontal guide rails 332, 334 towards each other, and thus, radially moving upper and lower displacer elements 312, 322; 312, 324 for gathering the filled tubular casing M. Gathering mechanism 340 will be disclosed in greater detail in conjunction with FIG. 3. The radial movement of upper and lower displacer elements 312, 322; 312, 324 is derived from second cam 524 of cam plate 520.

Since electric motor drives central shaft 510, and the movement of the closing tools 212, 222 and the radial gathering movement of the upper and lower displacer elements 312, 322; 312, 324 is derived from central shaft 510, mechanical coupling means 500 provide a fixed relation ship between the movement of the clipping tools 212, 222 and the movement of the upper and lower displacer elements 312, 322; 312, 324.

Single drive means 600 comprises electric motor 602, a horizontally arranged belt conveyor 620 driven by motor 602, horizontal guide means 610 having an upper and a lower guide rail 612a, 612b which are arranged parallel to each other and approximately vertically one upon the other, and a slide 614 movable along guide rails 612a, 612b by belt conveyor 620. Single drive means 600 further comprise a coupling element or coupling rod 630 for coupling slide 614 to vertical guide rod 336 of guide means 330. Single drive means 600 is arranged laterally to guide means 330 and at least partially downstream thereto. When activated, single drive means 600 reversibly move second displacer unit 320 in axial direction, i.e. in a horizontal plane, along guide rails 312, 314 of guide means 330, for forming a plait-like portion P to the tubular casing M just filled.

As it can further be seen in FIG. 2, a discharge device 700 in the form of a horizontally arranged belt conveyor is positioned downstream clipping machine 100 for discharging the sausage-shaped product S just produced out of clipping machine 100. Discharge device or belt conveyor 700 has a first end 702 and a second end 704, and is positioned with its first end 702 closed to clipping machine 100 and aligned in transportation direction T coaxially with feeding direction F. Belt conveyor 700 includes a conveyor belt 710 and drive means 720 for driving conveyor belt 710 in transportation direction F.

Belt conveyor 700 further includes means 730 for adjusting its height relative to clipping machine 100. The adjustment means 730 include at least approximately vertically arranged guide means, including linear guide means, along which belt conveyor 700 may vertically be moved, manually, or in case that a drive element, like an electric motor is provided, automatically, e.g. controlled by the control unit.

The height of belt conveyor 700, and particularly the height of the upper run of conveyor belt 710 is adjusted such that the lower edge of lower displacer element 324 of second displacer unit 320, when being radially moved away from first displacer unit 310 for forming a plait-like portion P, does not collide with conveyor belt 710. Moreover, there is space left between the lower edge of lower displacer element 324 when second displacer unit 320 is in the closed position. This space between lower edge of displacer element 324 and conveyor belt 710 allows the movement of displacer elements 312, 322; 312, 324 from their closed position towards their opened position about a distance which enables releasing the plait-like portion of the sausage-shaped product just produced, without engaging conveyor belt 710.

The distance between first end 702 of belt conveyor 700 and the left end of filling tube 10, or the left end of casing brake CB, respectively, is selected such that first and second displacer units 310, 320, when being positioned adjacent to each other, may pass belt conveyor 700 when reversibly moving between their opened and closed position.

Moreover, for forming a short plait-like portion P for producing tightly filled sausage-shaped products, second displacer unit 320, when in the closed position, is linearly moved in axial and horizontal direction away from first displacer unit 310, for allowing first and second closing tools 212, 222 entering the space between first and second displacer units 310, 320, for applying and closing two closure clips C on plait-like portion P. Accordingly, and as an alternative embodiment, the distance between first end 702 of belt conveyor 700 and the left end of filling tube 10, or the left end of casing brake CB, respectively, is further selected such that second displacer unit 320, particularly lower displacer element 324, may pass belt conveyor 700 when reversibly moving between their opened and closed position, after being radially moved away from first displacer unit 310 for forming said short plait-like portion P.

It has to be understood that clipping machine 100 comprises a framework for supporting and bearing various machine elements. The framework, from which only frame element FE is shown in FIGS. 2 and 3, provides bearings for rotatable supporting the shafts, like central shaft 510, or for providing fixed support for non-movable elements like drive motors 402, 602.

FIG. 3 is a detailed view to clipping machine 100 according to FIG. 2. In FIG. 3, toothed belts 406, 532, tensioning roller 534, single drive means 600 and belt conveyor 700 have been omitted, for a better understanding.

Clipping machine 100 comprises first closing tool arrangement 210 which includes punch 212. Punch 212 is actuated by a crank mechanism including a crank shaft 214, a linearly vertically movable plunger 216 guided in a guide element 217, and a guide track 218. Punch 212 is attached to the lower end of plunger 216. The upper end of plunger 216 is fixedly coupled to guide track 218 which is slidably accommodated in a slide block 219. Slide block 219 is rotatably coupled to the crank pin of crank shaft 214. While rotating crank shaft 214, slide block 219 rotates together with the crank pin of crank shaft 214, slide block 219 thereby slides along guide track 218, whereby only the vertical movement of guide block 219 is transmitted to plunger 216 which reversibly and vertically moves punch 212 between the opened and closed position. A cutting mechanism 230 is provided at the lower end of plunger 216 and associated with punch 212. Cutting mechanism 230 includes a cutting drive 232 and a cutting element 234. Cutting element 234 may be driven such that it engages between the two closure clips C applied and closed at plait-like portion P, and to cut the casing material M between the clips C for severing the just produced sausage-shaped product S from the remaining tubular casing material M.

As can be seen in FIG. 3, gathering means 300 of clipping machine 100 include first and second displacer units 310, 320 having upper and lower displacer elements 312, 322; 312, 324. Displacer elements 322, 324 of second displacer unit 320 are slidably coupled by coupling elements 326 to horizontal guide rails 332, 332 and vertical guide rod 336.

Gathering mechanism 340 for reversibly radially and at least substantially vertically moving upper and lower displacer elements 312, 322; 312, 324 of first and second displacer units 310, 320 between their opened and closed positions for executing the gathering operation, comprises two drive rods 342, 344 arranged vertically to each other and in a plane upstream and parallel to cam plate 520. Drive rod 342 is arranged proximal to central shaft 510, and drive rod 344 is arranged distal to central shaft 510. Cross beams 346, 348 are arranged in the upper and lower regions of drive rods 342, 344. Cross beam 346 is slidably connected to drive rod 342 and fixedly attached to the upper end of drive rod 344, whereas cross beam 348 is slidably connected to drive rod 344 and fixedly attached to the lower end of drive rod 342. Upper displacer element 312 is attached to upper cross beam 346, and lower displacer element 314 is attached to lower cross beam 348.

Drive rods 342, 344 may reversibly vertically be moved by a gathering drive 350. Gathering drive 350 comprises a drive wheel 352 arranged in the plane formed by drive rods 342, 344 and rotatably supported by the framework of clipping machine 100 between drive rods 342, 344. The diameter of drive wheel 352 corresponds to the distance between drive rods 342, 344. Drive wheel 352 is at least partially provided with teeth at its outer circumferential surface, which engage corresponding teeth arranged at the surface of drive rods 342, 344 facing drive wheel 352. A pivot lever 354 is coupled to drive wheel 352 by its one end. A cam lever 356 has a first end 356a and a second end 356b, and is pivotally connected to the other end of pivot lever by first end 356a. At the second end 356b of cam lever 356, a cam roller (not shown) is arranged which engages cam 524 of cam plate 520.

When rotating cam plate 520, cam lever 356 is pivoted about its pivot axis, and drive wheel 352 is reversibly rotated about an angle by pivot lever 354. Drive wheel 352 thereby moves drive rods 342, 344 reversibly up- and downwards. While drive rod 342 is moved downwards, at the same time, drive rod 344 is moved upwards. Upper and lower displacer elements 312, 322; 312, 324 of first and second displacer units 310, 320 coupled to drive rods 342, 344, are moved from their closed position into the opened position. And, while drive rod 342 is moved upwards and drive rod 344, at the same time, is moved downwards, upper and lower displacer elements 312, 322; 312, 324 are moved from their opened position into the closed position.

Moreover, a gathering adjustment mechanism 360 is arranged at the pivot axis of cam lever 356, for adjusting the position of the pivot axis of cam lever 356. By varying the position of the pivot axis of cam lever 356, the pivot angle of pivot lever 354 may be varied, whereby, the minimum distance between the upper and lower displacer elements 312, 322; 312, 324 in the closed position may be adjusted, e.g. for adapting the gathering mechanism, or the clipping machine respectively, to different kinds of tubular casing material M and/or to different filling material.

Figure 4:
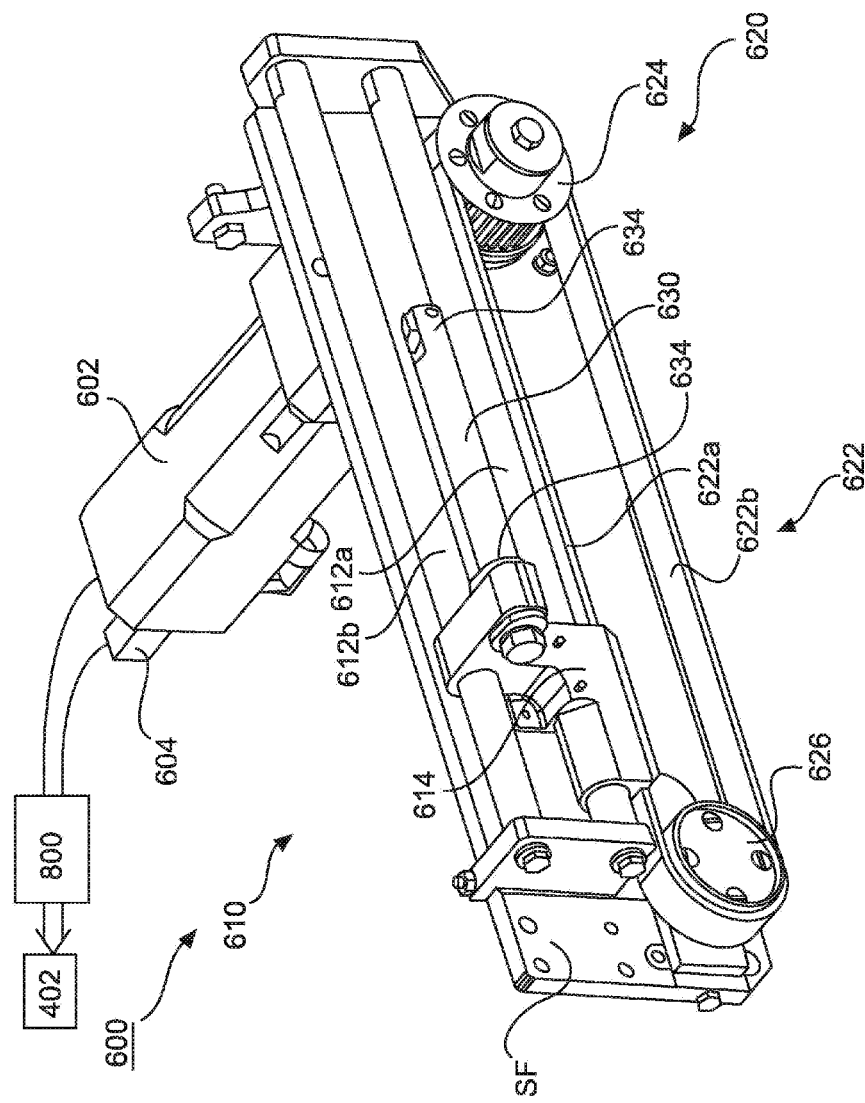
FIG. 4: is a schematic and perspective view to the embodiment of the single drive means according to the clipping machine of FIG. 2.

FIG. 4 is a schematic and perspective view to the embodiment of single drive means 600 according to clipping machine 100 of FIG. 2.

Single drive means 600 comprises, as its main components, electric motor 602 and horizontally arranged belt conveyor 620 having a conveyor belt 622, a first deflection roller 624 and a second deflection roller 626. Conveyor belt 622 is wound about first and second deflection rollers 624, 626, thereby forming an upper run 622a and a lower run 622b. On the shaft or rotor of motor 602, first deflection roller 624 is mounted for driving conveyor belt 622. In the particular embodiment of FIG. 4, first deflection roller is a toothed wheel, and conveyor belt 622 is a toothed belt. Naturally, a gear box may be arranged between motor 602 and first deflection roller 624 for adapting the rotational speed of first deflection roller 624.

Vertically above belt conveyor 620, horizontal guide means 610 with its upper and lower guide rails 612a, 612b is arranged, which extend from first deflection roller 624 to second deflection roller 626. Upper and lower guide rails 612a, 612b are supported at their ends by a framework SF which also carries other components of single drive 600, like motor 602 and belt conveyor 620 and which is attached to frame work FE of clipping machine 100.

Slide 614 is fixedly connected to upper run 622a of conveyor belt 622, and is horizontally reversibly movable by belt conveyor 620 between first and second deflection rollers 624, 626. Slide 614 is slidably coupled to upper and lower guide rails 612a, 612b of horizontal guide means 610, and is guided by horizontal guide means 610 while being reversibly moved by conveyor belt 622.

Coupling rod 630 has a first end 632 and a second end 634, and is fixedly attached to slide 614 by its first end 632. Coupling rod 630 is horizontally arranged and directed with its second end 634 towards guide means 330, i.e., in a direction opposite to feeding direction F. As explained above in conjunction with FIG. 2, second end 634 of connecting rod 630, is coupled to vertical guide rod 336 of guide means 330 for reversibly moving second displacer unit 320 in axial direction along guide rails 332, 334 of guide means 330 in order to form a plait-like portion P to tubular casing M just filled.

For producing a sausage shaped product S on clipping machine 100, tubular casing material M stored on filling tube 10 and closed at its front end by a closure clip C, is filled with filling material which is fed through the filling tube into tubular casing M in feeding direction F. After a predetermined portion of filling material is fed into tubular casing M, upper and lower displacer elements 312, 322; 314, 324 of first and second displacer units 310, 320 are moved from their opened position, in which upper and lower displacer elements 312, 322; 314, 324 are at their maximum distance to each other, into their closed position in which upper and lower displacer elements 312, 322; 314, 324 are at their minimum distance, for gathering the filled tubular casing M. Thereafter, second displacer unit 320 carries out a linear movement in a horizontal plane and coaxially to feeding direction F. Thereby, a plait-like portion P is formed to the gathered tubular casing material M, and two closure clips C are applied to plait-like portion P and closed by clipping device 200, a first closure clip C for closing the just filled tubular casing M for forming a sausage-shaped product S and a second closure clip C for closing the front end of sausage-shaped product S subsequently to be produced. Cutting mechanism 230 cuts tubular casing material M between the two closure clips C for severing the sausage-shaped product S just produced from the remaining tubular casing material M. Sausage-shaped product S just produced is discharged from clipping machine 100 by belt conveyor 700.

According to the present invention, the movement of clipping tools 212, 222 and gathering movement of displacer elements 312, 322; 314, 324 of displacer units 310, 320, namely the reversibly radial movement for gathering the filled tubular casing M, are derived from common drive means 400, whereas the axial movement of second displacer unit 320 is derived from single drive means 600.

The movement and the positions of displacer elements 312, 322; 314, 324 and clipping tools 212, 222 are in a fixed relation to each other, since displacer elements 312, 322; 314, 324 and clipping tools 212, 222 are fixedly coupled to each other by mechanical coupling means 500. Cam of cam plate 520 driven by motor 402 via central shaft 510, defines the movement of die 222. Synchronized by central shaft 510, and driven via belt 532, punch 212 moves together with die 222, reversibly between their extreme positions, the opened position with the maximum distance between punch 212 and die 222 as shown in FIGS. 2 and 3, and the closed position with the minimum distance between punch 212 and die 222.

Further synchronized by central shaft 510 is the movement of displacer elements 312, 322; 314, 324 to the movement of punch 212 and die 222, when being moved between their opened position as shown in FIG. 2, and their closed position.

This synchronization means that, by activating motor 402, displacer elements 312, 322; 314, 324 and clipping tools 212, 222 are moved, and when shutting down motor 402, the movement of displacer elements 312, 322; 314, 324 and clipping tools 212, 222 is stopped. Furthermore, when accelerating or decelerating motor 402, also the movement of displacer elements 312, 322; 314, 324 and clipping tools 212, 222 is accelerated or decelerated, accordingly.

Independently from common drive means 400, second displacer unit 320 may reversibly axially be moved in filling direction F by single drive means 600.

Common drive means 400 and single drive means 600 are coupled to a control unit 800, for coordinating common drive means 600 and single drive means 400 during the production process. Particularly, common drive means 600 and single drive means 400 include respective sensors 404, 604, like rotary encoders, which e.g. may be associated with central shaft 510 of common drive means 400 and first deflection roller 624 of single drive means 600, for capturing the current driving speed, e.g. the current revolution. Naturally, sensors for capturing the current drive speed of common drive 400 and single drive 400 may be placed at any suitable element of the respective drive means, like the rotor of motors 402, 602 or any other element moving with a speed corresponding to the movement or speed of displacer elements 312, 322; 314, 324 and clipping tools 212, 222. In the embodiment of clipping machine 100 according to FIGS. 2 to 3 sensor 404 associated with common drive means 400, is directly coupled with the rotor of electric motor 402, and sensor 602 associated with common drive means 600 is directly coupled with the rotor of electric motor 602.

In order to enable an adaption of belt conveyor 700 to different kinds of sausage-shaped products S to be produced on clipping machine 100, the height of belt conveyor may be varied. Respective vertical adjustment means 730, are provided, for adjusting the height of belt conveyor 700, particularly, the height of the upper run of conveyor belt 710, to the lower surface of sausage-shaped product S to be produced, by means of which it is deposited on belt conveyor 700, for being discharged from clipping machine 100.

A third sensor 732 is provided at belt conveyor 700, for detecting the position of belt conveyor 700, at least with regard to its vertical position relative to clipping machine 100, and which is coupled to control unit 800 of clipping machine 100. On the basis of the signal of sensor 732, clipping machine 100 may only be started, whether the detected height of belt conveyor 700 matches the respective size, particularly, the respective diameter of the sausage-shaped product S to be produced. Sensor 732, in the shown embodiment, is coupled to vertical adjustment means 730, but may also be provide at any other suitable position on belt conveyor 700.

Clipping machine 100 is adapted to produce sausage-shaped products S not only of different length or diameter, but also sausage-shaped products S being tightly filled or being slack filled. Moreover, clipping machine 100 is adapted to produce slack filled sausage-shaped products S of different filling degree. Exemplarily, the production of a tightly filled sausage shaped product S and a slack filled sausage-shaped product S is explained below.

For producing a tightly filled sausage shaped product S, tubular casing M being closed at its front end by a closure clip C, is filled with a predetermined portion of filling material. Thereafter, common drive means 400 are activated, for moving displacer elements 312, 322; 314, 324 of first and second displacer units 310, 320 from their opened position into their closed position, thereby forming a tightly filled portion of tubular casing M. Also clipping tools 212, 222 are moved towards their closed position, but with a backlash to displacer elements 312, 322; 314, 324. Immediately after displacer elements 312, 322; 314, 324 have reached their closed position, in which the filled tubular casing M is gathered, single drive means 600 are activated and second displacer unit 320, which during the gathering movement is positioned adjacent first displacer unit 310, is moved only a short distance in axial direction away from first displacer unit 310, for forming a short plait-like portion P to tubular casing M. The tightly filled portion of tubular casing M is moved in filling direction F and a respective length of casing material M is pulled off from the filling tube. The plait-like portion P is sufficient for applying two closure clips C thereto, a first closure clip for closing the just filled tubular casing M for forming a sausage-shaped product S, and a second closure clip C for closing the front end of tubular casing M stored on filling tube 10. Depending on the backlash of closing tools 212, 222 with regard to displacer elements 312, 322; 314, 324, common drive means 400 may be stopped or their speed may be reduced, after the displacer elements 312, 322; 314, 324 have reached their closed position, and during the forming of plait-like portion P by axially moving second displacer unit 320 by single drive means 600.

After the plait-like portion P has been formed, common drive means 400 are activated for finishing the closing operation, and for returning the displacer elements 312, 322; 314, 324 and clipping tools 212, 222 into their opened position.

After being moved into their closed position, displacer elements 312, 322; 314, 324 of first and second displacer units 310, 320 are positioned in a minimum distance to each other. Particularly, the lower edges of lower displacer elements 314, 324 are at a height above the upper run of conveyor belt 710 of belt conveyor 700. In case that the distance between first end 702 of belt conveyor 700 and the left end of casing brake CB, is selected such that first and second displacer units 310, 320, when being positioned adjacent to each other, may pass belt conveyor 700 when reversibly moving between their opened and closed position, after having formed plait-like portion P, displacer elements 322, 324 of second displacer unit 320 are positioned above conveyor belt 710. Thus, for finishing the production process of sausage-shaped product S, after the plait-like portion P has been cut between the two closure clips C, displacer units 310, 320, by activating common drive 400, are moved from their closed position towards the opened position, in a first step only about a short distance sufficiently for releasing plait-like portion P of just produced sausage-shaped product S together with closure clip C attached thereto, and without engaging conveyor belt 710 of belt conveyor 700. Hereafter, second displacer unit 320 is shifted towards first displacer unit 310, by single drive means 600. After passing first end 702 of belt conveyor 700, first and second displacer units 310, 320 may be moved into their opened position, by common drive means 400.

In case that the distance between first end 702 of belt conveyor 700 and the left end of casing brake CB, is selected such that second displacer unit 320, particularly lower displacer element 324, may pass belt conveyor 700 when reversibly moving between their opened and closed position, after being radially moved away from first displacer unit 310 for forming said short plait-like portion P, the above described step of moving displacer elements 312, 322; 314, 324 at first about a short distance from their closed position towards their opened position, for releasing plait-like portion P of the sausage-shaped product S just produced, is not necessary.

For producing a slack filled sausage shaped product (not shown), tubular casing M being closed at its front end by a closure clip C, is filled with a predetermined portion of filling material. Thereafter, common drive means 400 are activated, for moving displacer elements 312, 322; 314, 324 of first and second displacer units 310, 320 from their opened position into their closed position. Also clipping tools 212, 222 are moved towards their closed position, but with a backlash to displacer elements 312, 322; 314, 324. Immediately after displacer elements 312, 322; 314, 324 have reached their closed position, in which the filled tubular casing M is gathered, single drive means are activated and second displacer unit 320 is moved distance in axial direction away from first displacer unit 310 which corresponds to the required length of plait-like portion P, for forming a sausage-shaped product S having the required filling degree. After the displacer elements 312, 322; 314, 324 have reached their closed position, and during the forming of plait-like portion P by axially moving second displacer unit 320 about the required distance by single drive means 600, common drive means 400 may be stopped or their speed may be reduced. The delay of the further movement of closing tools 212, 222, which allows the forming of a plait-like portion P, may be adapted according to the required length of plait-like portion P. Depending on the required filling degree, and additionally depending on the kind of casing material and/or the kind of filling material, the drive speed of common drive means 400 and single drive means 600 may be varied, controlled by the control unit 800.

As explained above, after having formed plait-like portion P, second displacer unit 320 is positioned vertically above belt conveyor 700. Accordingly, after plait-like portion P is cut between the two closure clips C by cutting means 230, displacer units 310, 320, by activating common drive 400, are moved from their closed position towards the opened position, in a first step only about a short distance sufficiently for releasing plait-like portion P of the just produced sausage-shaped product S together with closure clip C attached thereto, and without engaging conveyor belt 710 of belt conveyor 700. Hereafter, second displacer unit 320 is shifted towards first displacer unit 310, by single drive means 600. After passing first end 702 of belt conveyor 700, first and second displacer units 310, 320 may be moved into their opened position, by common drive means 400.

As a further example, for producing sausage-shaped products of identical size, but with different casing material or different filling material, not only the speed of the gathering movement may be selected by controlling common drive means 400. Also, the speed of the axial movement of second displacer unit 320 for forming the plait-like portion P may be selected accordingly, by controlling single drive means 600. That means, the gathering movement may be executed at a lower speed when filling heavy or viscous filling material. Otherwise, when filling very soft filling material, the speed of the gathering movement may be higher.

Due to the mechanical coupling means 500, displacer elements 312, 322; 314, 324 and closing tool 212, 222, during one production or clipping cycle, are necessarily moved between their two extreme positions, the opened position and the closed position. For adapting clipping machine 100 to the production of sausage-shaped products S having a small diameter, in order to reduce the length of the moving path of displacer elements 312, 322; 314, 324 and closing tool 212, 222 during the gathering movement and the closing movement, common drive means 400 may be already activated during the filling operation, for moving displacer elements 312, 322; 314, 324 and closing tool 212, 222 towards each other to a distance being slightly larger than the diameter of the sausage-shaped product S to be produced. In this intermediate position, common drive means 400 may be stopped until the filling operation is finished. Alternatively, common drive means 400 may be operated at a lower speed, for reaching the intermediate position exactly at that point in time when the filling operation is finished, so that common drive means 400 need not to be stopped. For continuing the gathering and closing process, common drive means 400 may be driven at the current low speed, or at a higher speed, dependent on the kind of filling material or casing material.

Generally, during the production of sausage-shaped products S, the drive speed of common drive means 400 and single drive means 600 may be varied according to the kind of sausage-shaped products S to be produced or the materials used, the tubular casing M and/or the filling material, at least one of the drive means 400, 600 may be stopped. Thereby, the production process is executed in defined steps separated by stopping one of drive means 400, 600. Alternatively, common drive means 400 and single drive means 600 may continuously be driven, with at least one of drive means 400, 600 driven at a very low speed. This prevents stopping the movement of elements of common or single drive means 400, 600, and a respective restart of this movement and to overcome inert forces of said elements.

Additionally, the inventive method, namely controlling the movement of common drive means 400 and single drive means 600 independently from each other, enables a seamless transition of the radial movement of displacer elements 322, 324 of second displacer unit 320 for gathering filled tubular casing M, driven by common drive means 400, into the axial direction for forming plait-like portion P, driven by single drive means 600. That means that displacer elements 322, 324 of second displacer unit 320, driven by common drive means 400, may execute the radial movement for gathering filled tubular casing M, particularly the final degrees for finishing the gathering movement, and, at the same time, the axial movement of second displacer unit 320 may already be started by single drive means 600.

Additionally to controlling the production process, based on the signals of the sensors 404, 604 associated with common drive means 400 and single drive means 600, and further the additional signals of sensor 732 of the belt conveyor 700, the position of each element moved by common drive means 400, single drive means 600 and the position of belt conveyor 700 are known at any point in time before, during and after the production process. These information enable running a predefined program for moving the elements coupled to common drive means 400, single drive means 600 or belt conveyor 700, in case that belt conveyor 700 is vertically moved by an additional drive means for driving vertical adjustment means 730, for preventing collisions of these elements. The signals may also be used for synchronizing the movement of all movable parts, i.e. when starting clipping machine 100, common drive means 400 and single drive means 600, based on the signals of said sensors 404, 604 may run a predefined way to be moved into a starting position. This predefined movement is selected such that while moving into the starting position, independent from their current position, a collision between the movable elements coupled to common drive means 400 and single drive means 600, is prevented. This feature may be used e.g. for securely preventing collisions after a maintenance or after cleaning the inventive clipping machine 100.

Additionally, sensor 732 associated with belt conveyor 700 may be designed as a proximity sensor, which, for preventing a collision, may stop clipping machine 100 in case that the position of belt conveyor 700 is incorrect.

It has to be noted that clipping machine 100 is controlled based on the positions detected by sensors 404, 604, 732 associated with common drive means 400 and single drive means 600, and as an additional feature, also the position of belt conveyor 700. Moreover, the positions of common drive means 400, single drive means 600 and the position of belt conveyor 700 are permanently monitored, at least during the production process. It has to be noted that control unit 800 may be provided with different programs for operating clipping machine 100, like programs for producing standardized products or specific products. Alternatively, control unit 800 may provide basic programs which may be varied by a user for adapting the production process to specific products.

Common drive means 400 and single drive means 600 have been disclosed as comprising toothed wheels and toothed belts for driving displacer units 310, 320 and closing tools 212, 222. Naturally, other transmitting means may be provided, like chain drives or V-belt drives.

Also, the linear movement of second displacer unit 320 may be executed by other drive means than a belt conveyor, e.g. an eccentric drive or a lever construction may be used.

Moreover, guide means 330 of single drive means 600 may be realized by other means than guide rails, e.g. dovetail guide may be used.

What is claimed is:

1. A clipping machine for producing sausage-shaped products by filing a flowable filling material into a tubular or bag-shaped packaging casing and closing said packaging casing by a closure means the clipping machine comprising:
   a filling tube for feeding the filling material into the tubular or bag-shaped packaging casing stored on the filling tube and being closed at its first end,
   gathering means for gathering the filled packaging casing and for forming a plait-like portion thereto, the gathering means including a first displacer unit and a second displacer unit, and a clipping device having a first and a second closing tool being reversibly movable between an opened position and a closed position, for applying at least one closure element to the plait-like portion and closing said closure element when the closing tools are in their closed position,
   common drive means for commonly reversibly radially moving the gathering means from an opened position into a closed position for performing the gathering movement, and the clipping tools for applying said closure element on the plait-like portion and closing said closure element,
   single drive means for separately reversibly driving the second displacer unit for executing a movement in axial direction for forming the plait-like portion, at least partially independently from the common drive means,
   a control unit for controlling the single drive means at least partially independently from the common drive means, and
   at least a first sensor associated with the common drive means and at least a second sensor associated with the single drive means, which are coupled to the control unit,
   wherein a discharge device is provided for discharging the sausage-shaped product just produced, from the clipping machine,
   wherein a third sensor is provided associated with the discharge device, and coupled to the control unit, and
   wherein the third sensor is adapted to detect the position of the discharge device relative to the clipping machine.

2. The clipping machine according to claim 1, wherein the first and second sensors are adapted for detecting the moving paths of the common drive means and the single drive means, respectively.

3. The clipping machine according to claim 1, wherein the common drive means include an electric drive motor and mechanical coupling means for positively coupling the radial movement of the gathering means and the radial movement of the clipping tools.

4. The clipping machine according to claim 3, wherein the mechanical coupling means include a cam plate having a first cam for reversibly radially moving the gathering means, and a second cam for reversibly radially moving the second closing tool, and a belt drive coupled to the cam plate, for reversibly radially moving the first closing tool.

5. The clipping machine according to claim 1, wherein the first closing tool is at least substantially linearly movable between the opened position and the closed position, in an at least substantially radial direction.

6. The clipping machine according to claim 1, wherein the second closing tool is attached to a tool arm for being pivoted between the opened position and the closed position.

7. The clipping machine according to claim 1, wherein the single drive means include an electric drive motor.

8. The clipping machine according to claim 7, wherein the single drive means further include a drive belt or a drive chain and a linear guidance to which the second displacer unit is coupled.

9. The clipping machine according to claim 1, wherein the control unit is adapted to vary the drive speed at least of the common drive means.

10. The clipping machine according to claim 1,
wherein the control unit is adapted to vary the start or end point of a clipping cycle.

11. The clipping machine according to claim 10,
wherein the discharge device includes means for adjusting the height of the discharge device.

12. A method for producing sausage-shaped products on a clipping machine, the clipping machine comprises a filling tube for feeding filling material into the tubular or bag-shaped packaging casing stored on the filling tube and being closed at its first end, gathering means for gathering the filled packaging casing and for forming a plait-like portion thereto, the gathering means including a first displacer unit and a second displacer unit, and a clipping device having a first and a second closing tool being reversibly movable between an opened position and a closed position, for applying at least one closure element to the plait-like portion and closing said closure element when the closing tools are in their closed position, a common drive means for commonly reversibly driving the gathering means for performing the gathering movement, and the clipping tools for applying said closure element on the plait-like portion and closing said closure element, a single drive means for reversibly driving the second displacer unit for executing a movement in axial direction for forming the plait-like portion, a control unit for controlling the common drive means and the single drive means, and at least a first sensor and a second sensor which are coupled to the control unit, the first sensor being associated with the common drive means and the second sensor being associated with the single drive means,
wherein a discharge device is provided for discharging the sausage-shaped product just produced, from the clipping machine,
wherein a third sensor is provided associated with the discharge device, and coupled to the control unit, and
wherein the third sensor is adapted to detect the position of the discharge device relative to the clipping machine,
the method comprises the steps of:
filling a predetermined portion of filling material into the tubular or bag-shaped packaging casing stored on the filling tube,
gathering the filled packaging casing by radially moving the gathering means from an opened position into a closed position, and applying and closing at least one closure element to a plait-like portion formed by the gathering means, by commonly driving the gathering means and the clipping tools by the common drive means, and
moving the second displacer unit in axial direction for forming said plait-like portion on which the at least one closure element has to be applied, by the single drive means at least approximately independently from said common drive means,
controlling the movement of the single drive means by the control unit, at least partially independently from the common drive means.

\* \* \* \* \*